United States Patent
Finnegan

(10) Patent No.: US 10,373,502 B1
(45) Date of Patent: Aug. 6, 2019

(54) TECHNIQUES FOR DETECTING MULTIPLE TURN LANE DRIVING SCENARIOS AND SUPPRESSING BLIND SPOT MONITORING WARNINGS

(71) Applicant: Peter Finnegan, Royal Oak, MI (US)

(72) Inventor: Peter Finnegan, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/046,323

(22) Filed: Jul. 26, 2018

(51) Int. Cl.
*G08G 1/16* (2006.01)
*B60Q 9/00* (2006.01)

(52) U.S. Cl.
CPC .............. *G08G 1/167* (2013.01); *B60Q 9/008* (2013.01)

(58) Field of Classification Search
CPC .... G08G 1/167; B60Q 9/008; G06K 9/00798; G06K 9/00825
See application file for complete search history.

(56) References Cited

U.S. PATENT DOCUMENTS

| 8,004,425 | B2 | 8/2011 | Hoek et al. |
| 2011/0137528 | A1 | 6/2011 | Le et al. |
| 2013/0135089 | A1 | 5/2013 | Sejalon et al. |
| 2013/0211682 | A1 | 8/2013 | Joshi et al. |
| 2014/0016826 | A1 | 1/2014 | Fairfield et al. |
| 2016/0306361 | A1 | 10/2016 | Shalom et al. |
| 2018/0082589 | A1* | 3/2018 | Park ........................ G06T 7/70 |

* cited by examiner

*Primary Examiner* — Brian A Zimmerman
*Assistant Examiner* — Sara B Samson
(74) *Attorney, Agent, or Firm* — Ralph E Smith

(57) ABSTRACT

An advanced driver-assistance system (ADAS) and method for a vehicle each utilize a driving scenario detection system configured to detect whether the vehicle is involved in a multiple turn lane driving scenario where the vehicle is in one of a plurality of neighboring turn lanes, a blind spot monitoring system comprising an object sensing device configured to detect one or more objects in one or more of the neighboring turn lanes and output a blind spot warning in response to detecting one or more objects in the one or more neighboring turn lanes, and a controller configured to, using the driving scenario detection system, detect that the vehicle is involved in the multiple turn lane driving scenario and, in response to detecting that the vehicle is involved in the multiple turn lane driving scenario, temporarily suppress the blind spot warning output by the blind spot monitoring system.

18 Claims, 3 Drawing Sheets

TECHNIQUES FOR DETECTING MULTIPLE TURN LANE DRIVING SCENARIOS AND SUPPRESSING BLIND SPOT MONITORING WARNINGS

FIELD

The present application generally relates to a vehicle advanced driver-assistance system (ADAS) and, more particularly, to techniques for detecting multiple turn lane driving scenarios and suppressing blind spot monitoring warnings.

BACKGROUND

Blind spot monitoring is one type of a vehicle advanced driver-assistance system (ADAS). A blind spot monitoring system utilizes one or more radar devices integrated in a rear fascia (e.g., a rear bumper) of the vehicle to detect objects (e.g., other vehicles) in neighboring lanes. When a nearby vehicle is detected, the blind spot monitoring system provides the driver an audible and/or visual warning (e.g., activation of a light in a side-view mirror). In multiple turn lane driving scenarios, the blind spot monitoring system could provide the driver with a warning even though the vehicle and a neighboring vehicle are following the same trajectory or path. These unnecessary warnings may be undesirable to drivers. Accordingly, while such a vehicle ADAS works well for its intended purpose, there remains a need for improvement in the relevant art.

SUMMARY

According to one example aspect of the invention, an advanced driver-assistance system (ADAS) for a vehicle is presented. In one exemplary implementation, the vehicle ADAS comprises: a driving scenario detection system configured to detect whether the vehicle is involved in a multiple turn lane driving scenario where the vehicle is in one of a plurality of neighboring turn lanes, a blind spot monitoring system comprising one or more object sensing devices configured to detect one or more objects in one or more neighboring lanes and output one or more blind spot warnings in response to detecting objects in the one or more neighboring lanes, and a controller configured to: using the driving scenario detection system, detect that the vehicle is involved in the multiple turn lane driving scenario and, in response to detecting that the vehicle is involved in the multiple turn lane driving scenario, temporarily suppress the one or more blind spot warnings output by the blind spot monitoring system.

In some implementations, the driving scenario detection system is a front-facing camera system configured to capture one or more images in front of the vehicle, and the controller is configured to detect that the vehicle is involved in the multiple turn lane scenario by analyzing the one or more captured images. In some implementations, the controller is configured to determine a traffic light status based on the analysis of the one or more images and detect that the vehicle is involved in the multiple turn lane driving scenario based on the determined traffic light status. In some implementations, the determined traffic light status includes two or more traffic lights associated with the plurality of neighboring turn lanes. In some implementations, the controller is further configured to detect a green status of the two or more traffic lights as a precondition for temporarily suppressing the one or more blind spot warnings output by the blind spot monitoring system.

In some implementations, the controller is further configured to detect one or more non-traffic light turn indicators in the one or more captured images as part of detecting that the vehicle is involved in the multiple turn lane driving scenario. In some implementations, the one or more non-traffic light turn indicators include one or more signs displaying a turn arrow. In some implementations, the driving scenario detection system is a vehicle-to-infrastructure (V2X) system configured to communicate with one or more traffic lights associated with the plurality of neighboring turn lanes or another nearby device as part of detecting that the vehicle is involved in the multiple turn lane driving scenario. In some implementations, the blind spot monitoring system comprises at least one of an audio device and a visual device configured to output the one or more blind spot warnings, and the controller is configured to temporarily suppress the output of the at least one of the audio device and the visual device.

According to another example aspect of the invention, a method of temporarily suppressing one or more blind spot warnings by a blind spot monitoring system of a vehicle during a multiple turn lane driving scenario is presented. In one exemplary method, the method comprises: detecting, by a controller and using a driving scenario detection system, whether the vehicle is involved in the multiple turn lane driving scenario where the vehicle is in one of a plurality of neighboring turn lanes and, in response to detecting that the vehicle is involved in the multiple turn lane driving scenario, temporarily suppressing, by the controller, the one or more blind spot warnings output by the blind spot monitoring system, the blind spot monitoring system comprising one or more object sensing devices configured to detect one or more objects in one or more neighboring lanes.

In some implementations, the driving scenario detection system is a front-facing camera system configured to capture one or more images in front of the vehicle, and detecting that the vehicle is involved in the multiple turn lane scenario comprises analyzing, by the controller, the one or more captured images. In some implementations, the method further comprises determining, by the controller, a traffic light status based on the analysis of the one or more images, and detecting, by the controller, that the vehicle is involved in the multiple turn lane driving scenario based on the determined traffic light status. In some implementations, the determined traffic light status includes two or more traffic lights associated with the plurality of neighboring turn lanes. In some implementations, the method further comprises detecting, by the controller, a green status of the two or more traffic lights as a precondition for temporarily suppressing the one or more blind spot warnings output by the blind spot monitoring system.

In some implementations, the method further comprises detecting, by the controller, one or more non-traffic light turn indicators in the one or more captured images as part of detecting that the vehicle is involved in the multiple turn lane driving scenario. In some implementations, the one or more non-traffic light turn indicators include one or more signs displaying a turn arrow. In some implementations, the driving scenario detection system is a V2X system configured to communicate with one or more traffic lights associated with the plurality of neighboring turn lanes or another nearby device as part of detecting that the vehicle is involved in the multiple turn lane driving scenario. In some implementations, the blind spot monitoring system comprises at least one of an audio device and a visual device configured to output the one or more blind spot warnings, and temporarily suppressing the output of the blind spot monitoring system comprises temporarily suppressing, by the controller, the output of at least one of the audio device and the visual device.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
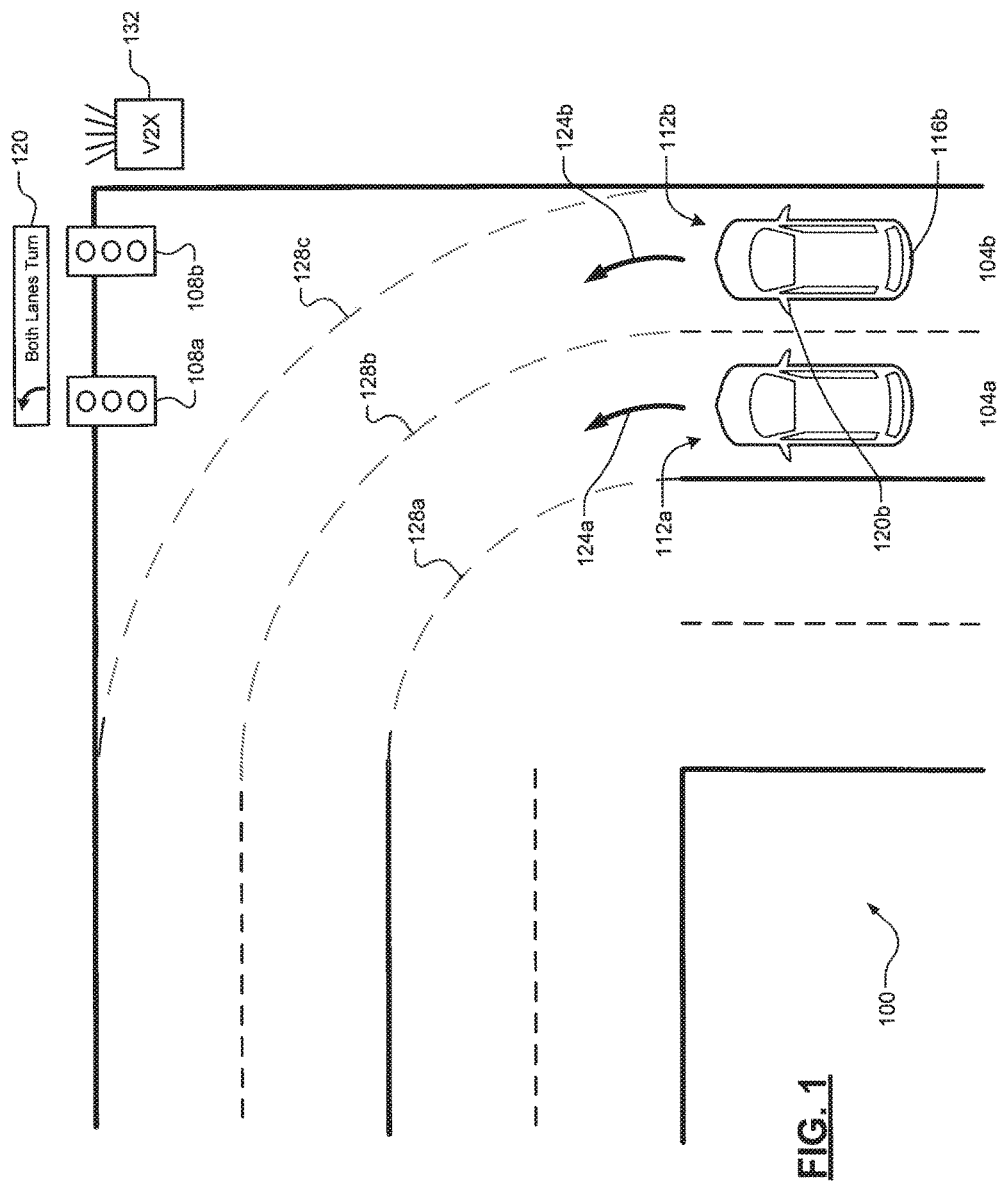
FIG. 1 is an overhead view of an example multiple turn lane scenario according to the principles of the present disclosure.

As previously discussed, conventional vehicle advanced driver-assistance systems (ADAS) include blind spot monitoring systems that output unnecessary blind spot warnings during multiple turn lane driving scenarios, which is annoying to drivers. Referring now to FIG. 1, an overhead 100 view of an example multiple turn lane driving scenario. As shown, there are two left turn lanes 104a and 104b, each having a respective traffic light 108a and 108b. Vehicle 112b is turning in the outermost left turn lane 104b while vehicle 112a is turning in the innermost left turn lane 104a. The blind spot monitoring system of vehicle 112b will output an unnecessary left-side blind spot warning (audible and/or visual) during its turn, even though the vehicles 112a, 112b are following the same trajectory or path. While a dual left turn only driving scenario is illustrated in FIG. 1, it will be appreciated that the techniques described herein are applicable to any multiple turn lane driving scenario, including scenarios where only one lane must turn and the other lane is an optional turn lane.

Figure 2:
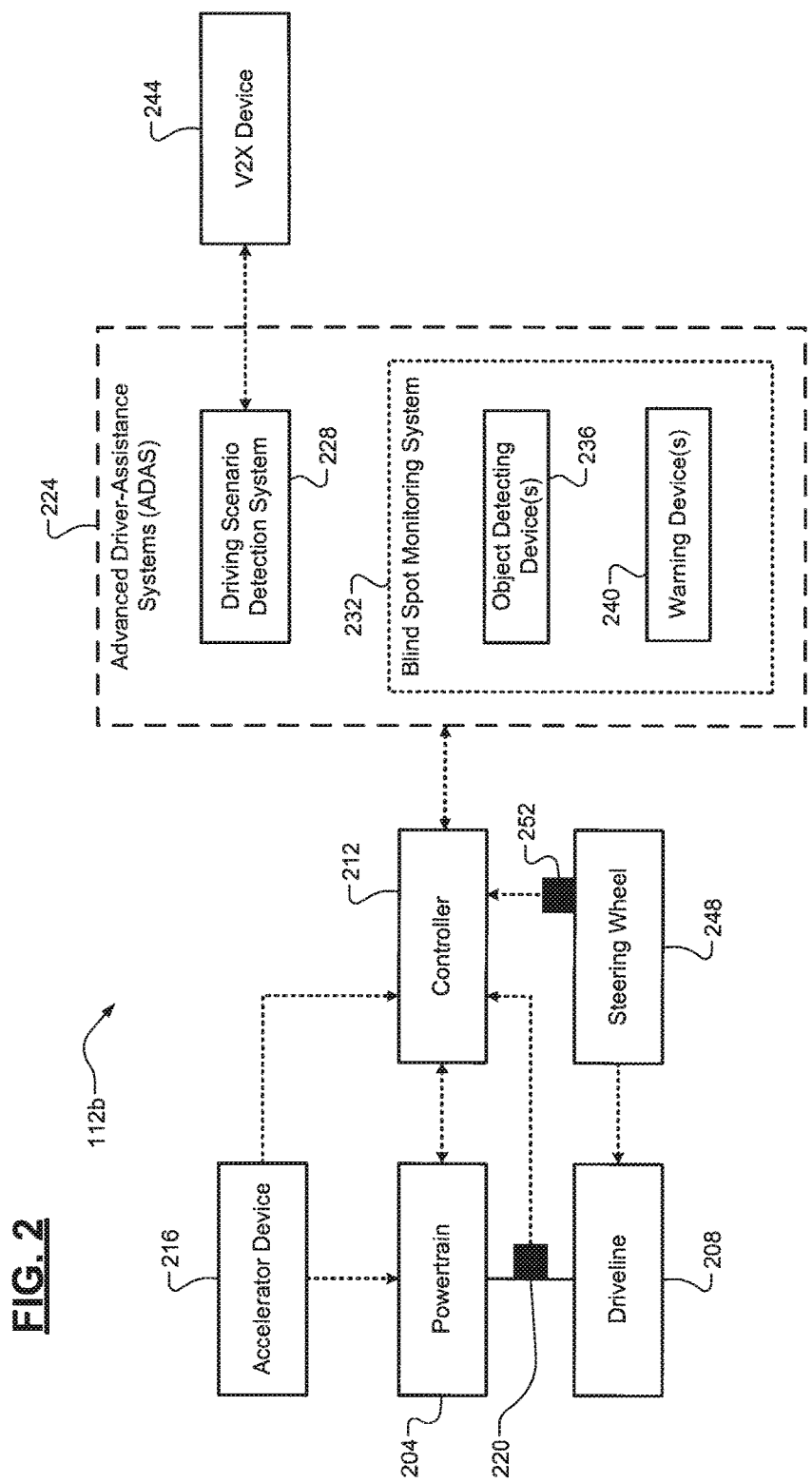
FIG. 2 is a functional block diagram of an example vehicle according to the principles of the present disclosure.

Referring now to FIG. 2 and with continued reference to FIG. 1, a functional block diagram of an example configuration of the vehicle 112b. The vehicle 112b includes a powertrain 204 that generates and transfers drive torque to a driveline 208 to propel the vehicle 112b. In one exemplary implementation, the powertrain 204 includes a torque generating device (an engine, an electric motor, or combinations thereof) and a transmission. A controller 212 (e.g., an engine control unit, or ECU) controls operation of the powertrain 204 to generated a desired drive torque based on driver input via an accelerator device 216. A vehicle speed sensor 220 measures a speed of the vehicle 112b. The vehicle 112b further includes an ADAS 224 that comprises a driving scenario detection system 228 and a blind spot monitoring system 232. While shown as a separate system, it will be appreciated that at least some portions or functionality of the ADAS 224 could be integrated in the controller 212. The blind spot monitoring system 232 further comprises one or more object detecting devices 236 (hereinafter, "radar devices 236"), e.g., integrated in a rear fascia 116b of the vehicle 112b, and one or more warning devices 240. While radar devices are specifically discussed herein, it will be appreciated that the object detecting devices 236 could be other suitable devices, such as lidar devices. In one exemplary implementation, the warning devices 240 comprise an audio device, such as a speaker, and a visual device, such as a light integrated in a side-view mirror 120b of the vehicle 112b.

The driving scenario detection system 228 could be, but is not limited to, a vehicle-to-infrastructure (V2X) system, a front-facing camera system, or some combination thereof. The driving scenario detection system 228 can be any suitable device or system capable of detecting that the vehicle 112 is involved in a multiple turn lane scenario, such as the one illustrated in FIG. 1. For a driving scenario detection system 228 comprising V2X capabilities, the system 228 could communicate with a V2X device 244, such as the traffic lights 108a, 108b or another nearby V2X device 132 to determine that the traffic lights 108a, 108b are associated with multiple turn lanes 104a, 104b. For a driving scenario detection system 228 comprising front-facing camera capabilities, the system 228 could capture one or more images in front of the vehicle 112b. These image(s) could then be analyzed to detect that the vehicle 112b is currently involved in a multiple turn lane driving scenario. This could include analyzing the configuration and/or status of the traffic lights 108a, 108b (e.g., green turn arrows) and/or analyzing traffic signs that visually display turn arrows or other indicators of a multiple turn lane driving scenario (e.g., a sign 120 that says "Both Lanes Turn" along with a left turn arrow). Other indicia could also be detected, such as turn arrows 124a, 124b and/or turn lines 128a, 128b, 128c on the road.

In response to detecting that the vehicle 112b is currently involved in a multiple turn lane driving scenario, the controller 212 is able to temporarily suppress one or more blind spot warnings (e.g., audio and/or visual) output by the blind spot monitoring system 232 (i.e., via the warning devices 240). The controller 212 could detect one or more preconditions before suppressing such blind spot warnings. Non-limiting examples of such preconditions include the traffic light status changing from red (stop) to green (go/proceed), the transmission being in drive, and the vehicle speed being above a threshold such as a few miles per hour. Information relating to a steering wheel 248 of the vehicle 112b could also be utilized in determining whether or not to temporarily suppress the blind spot warnings. For example, a steering wheel angle sensor 252 could measure the angle of the steering wheel 248, which could then be compared to pre-collected aggregate data of steering wheel behavior across a plurality of typical multiple turn lane driving scenarios.

Figure 3:
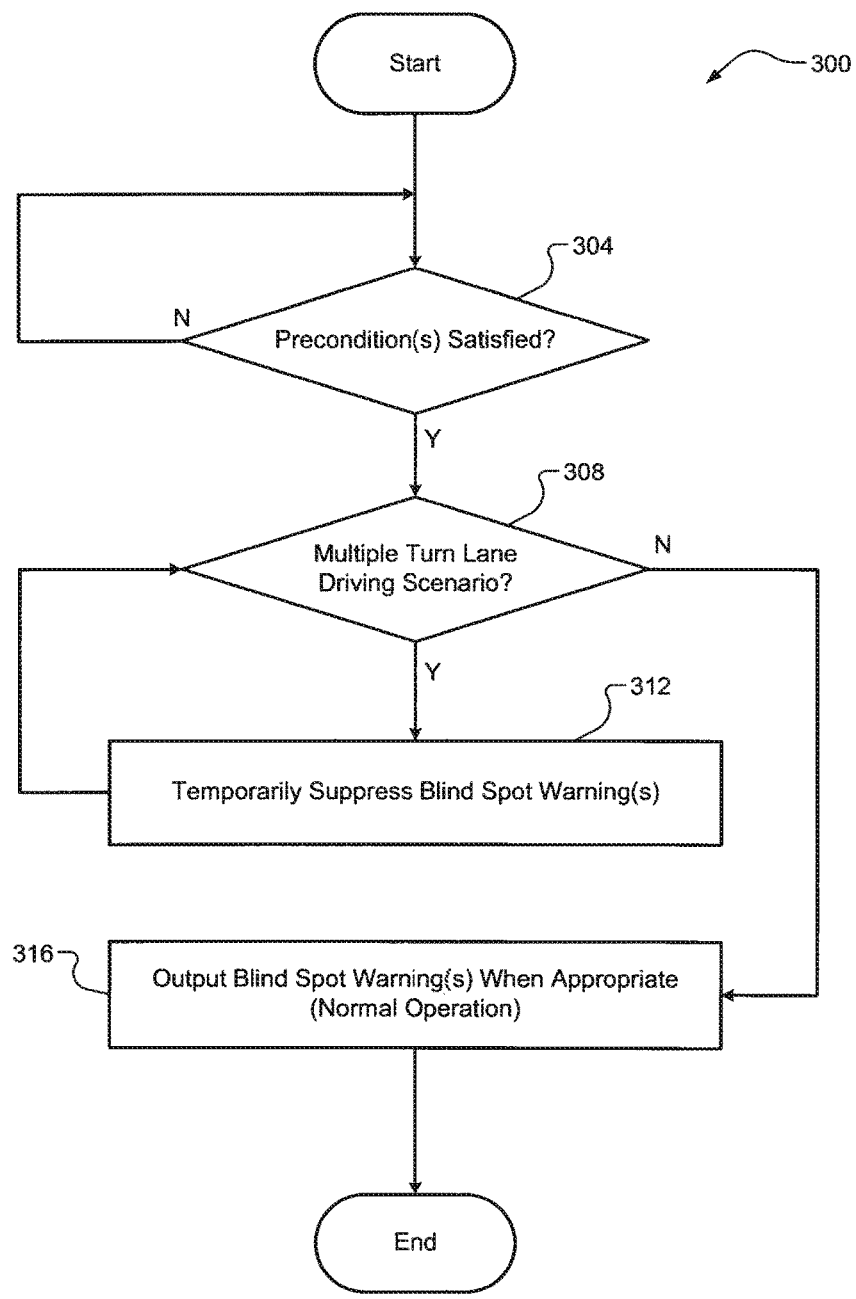
FIG. 3 is a flow diagram of an example method of detecting multiple turn lane driving scenarios and suppressing blind spot detection warnings according to the principles of the present disclosure.

FIG. 3 illustrates a flow diagram of an example method 300 of detecting multiple turn lane driving scenarios and suppressing blind spot monitoring warnings. At 304, the controller 212 optionally detects whether one or more preconditions are satisfied. When true, the method 300 proceeds to 308. Otherwise, the method 300 ends or returns to 304. As previously discussed, the one or more preconditions could include things such as the traffic light status changing from red to green, the transmission being in drive, and the vehicle speed increasing above a threshold. At 308, the controller 212 determines whether the vehicle 112b is currently involved in a multiple turn lane driving scenario using the driving scenario detection system 228. When true, the method 300 proceeds to 312. Otherwise, the method proceeds to 316. At 312, the controller 212 temporarily suppresses one or more blind spot warnings output by the blind spot monitoring system 232 and the method 300 returns to 308 where the controller 212 continues to determine whether the multiple turn lane driving scenario is still occurring. Once the multiple turn lane driving scenario ends, the method 300 proceeds to 316 where the controller 212 stops the suppression of the blind spot warnings output by the blind spot monitoring system 232 (i.e., return to normal operation where blind spot warnings are output when appropriate). The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver-assistance system (ADAS) for a vehicle, the vehicle ADAS comprising:
   a driving scenario detection system configured to detect whether the vehicle is involved in a multiple turn lane driving scenario where the vehicle is in one of a plurality of neighboring turn lanes;
   a blind spot monitoring system comprising an object sensing device configured to detect one or more objects in one or more of the plurality of neighboring turn lanes and output a blind spot warning in response to detecting the one or more objects in the one or more of the plurality of neighboring turn lanes; and
   a controller configured to:
      using the driving scenario detection system, detect that the vehicle is involved in the multiple turn lane driving scenario; and
      in response to detecting that the vehicle is involved in the multiple turn lane driving scenario, temporarily suppress the blind spot warning output by the blind spot monitoring system.

2. The vehicle ADAS of claim 1, wherein:
   the driving scenario detection system is a front-facing camera system configured to capture one or more images in front of the vehicle; and
   the controller is configured to detect that the vehicle is involved in the multiple turn lane scenario by analyzing the one or more captured images.

3. The vehicle ADAS of claim 2, wherein the controller is configured to determine a traffic light status based on the analysis of the one or more images and detect that the vehicle is involved in the multiple turn lane driving scenario based on the determined traffic light status.

4. The vehicle ADAS of claim 3, wherein the determined traffic light status includes two or more traffic lights associated with the plurality of neighboring turn lanes.

5. The vehicle ADAS of claim 4, wherein the controller is further configured to detect a green status of the two or more traffic lights as a precondition for temporarily suppressing the blind spot warning output by the blind spot monitoring system.

6. The vehicle ADAS of claim 2, wherein the controller is further configured to detect one or more non-traffic light turn indicators in the one or more captured images as part of detecting that the vehicle is involved in the multiple turn lane driving scenario.

7. The vehicle ADAS of claim 6, wherein the one or more non-traffic light turn indicators include one or more signs displaying a turn arrow.

8. The vehicle ADAS of claim 1, wherein the driving scenario detection system is a vehicle-to-infrastructure (V2X) system configured to communicate with one or more traffic lights associated with the plurality of neighboring turn lanes or another nearby device as part of detecting that the vehicle is involved in the multiple turn lane driving scenario.

9. The vehicle ADAS of claim 1, wherein:
   the blind spot monitoring system comprises at least one of an audio device and a visual device configured to output the blind spot warning; and
   the controller is configured to temporarily suppress the output of the at least one of the audio device and the visual device.

10. A method of temporarily suppressing a blind spot warning by a blind spot monitoring system of a vehicle during a multiple turn lane driving scenario, the method comprising:
    detecting, by a controller and using a driving scenario detection system, whether the vehicle is involved in the multiple turn lane driving scenario where the vehicle is in one of a plurality of neighboring turn lanes; and
    in response to detecting that the vehicle is involved in the multiple turn lane driving scenario, temporarily suppressing, by the controller, the blind spot warning output by the blind spot monitoring system, the blind spot monitoring system including one or more object sensing devices configured to detect one or more objects in one or more of the plurality of neighboring turn lanes.

11. The method of claim 10, wherein:
    the driving scenario detection system is a front-facing camera system configured to capture one or more images in front of the vehicle; and
    detecting that the vehicle is involved in the multiple turn lane scenario comprises analyzing, by the controller, the one or more captured images.

12. The method of claim 11, further comprising:
    determining, by the controller, a traffic light status based on the analysis of the one or more images; and
    detecting, by the controller, that the vehicle is involved in the multiple turn lane driving scenario based on the determined traffic light status.

13. The method of claim 12, wherein the determined traffic light status includes two or more traffic lights associated with the plurality of neighboring turn lanes.

14. The method of claim 13, further comprising detecting, by the controller, a green status of the two or more traffic lights as a precondition for temporarily suppressing the blind spot warning output by the blind spot monitoring system.

15. The method of claim 11, further comprising detecting, by the controller, one or more non-traffic light turn indicators in the one or more captured images as part of detecting that the vehicle is involved in the multiple turn lane driving scenario.

16. The method of claim 15, wherein the one or more non-traffic light turn indicators include one or more signs displaying a turn arrow.

17. The method of claim 10, wherein the driving scenario detection system is a vehicle-to-infrastructure (V2X) system configured to communicate with one or more traffic lights associated with the plurality of neighboring turn lanes or another nearby device as part of detecting that the vehicle is involved in the multiple turn lane driving scenario.

18. The method of claim 10, wherein:
   the blind spot monitoring system comprises at least one of an audio device and a visual device configured to output the blind spot warning; and
   temporarily suppressing the output of the blind spot monitoring system comprises temporarily suppressing, by the controller, the output of at least one of the audio device and the visual device.

\* \* \* \* \*